United States Patent
Jordan

(10) Patent No.: US 7,210,040 B2
(45) Date of Patent: Apr. 24, 2007

(54) DETECTION OF SUSPICIOUS PRIVILEGED ACCESS TO RESTRICTED COMPUTER RESOURCES

(75) Inventor: Myles Jordan, Melbourne (AU)

(73) Assignee: Computer Associates Think, Inc., Islandia, NY (US)

( * ) Notice: Subject to any disclaimer, the term of this patent is extended or adjusted under 35 U.S.C. 154(b) by 533 days.

(21) Appl. No.: 09/905,340

(22) Filed: Jul. 14, 2001

(65) Prior Publication Data

US 2002/0073323 A1 Jun. 13, 2002

Related U.S. Application Data

(60) Provisional application No. 60/218,333, filed on Jul. 14, 2000.

(51) Int. Cl.
*G06F 21/00* (2006.01)
(52) U.S. Cl. .................. 713/187; 713/188; 713/189; 726/24; 726/25; 726/26
(58) Field of Classification Search ............... 713/201, 713/187, 188, 189; 726/24, 25, 26
See application file for complete search history.

(56) References Cited

U.S. PATENT DOCUMENTS 5,623,600 A * 4/1997 Ji et al. ................. 713/201
5,826,013 A * 10/1998 Nachenberg ............ 713/200

* cited by examiner

*Primary Examiner*—Emmanuel L. Moise
*Assistant Examiner*—Paul Callahan
(74) *Attorney, Agent, or Firm*—Baker Botts L.L.P.

(57) ABSTRACT

Methods and apparatus for detecting computer viruses that attempt to gain access to restricted computer system resources are provided. The apparatus comprises an emulator component, a monitor component and a detector component. The emulator emulates computer executable code in a subject file. The monitor component monitors emulation of the computer executable code and monitoring a memory state of the computer system for modifications caused by the emulated instructions in the computer executable code. Based on information supplied by the monitor component regarding the emulated code and any modifications of the memory state, the detector component detects an attempt by the emulated code to access one or more of the restricted computer system resources.

18 Claims, 4 Drawing Sheets

DETECTION OF SUSPICIOUS PRIVILEGED ACCESS TO RESTRICTED COMPUTER RESOURCES

CROSS-REFERENCE TO RELATED APPLICATIONS

This application claims the benefit of co-pending provisional applications Ser. Nos. 60/218,333, filed Jul. 14, 2000 and entitled "DETECTION OF SUSPICIOUS PRIVILEGED ACCESS TO RESTRICTED COMPUTER RESOURCES."

TECHNICAL FIELD

The disclosure relates to the detection of computer viruses. More specifically, the disclosure relates to the detection of computer viruses that attempt to gain access to restricted computer system resources.

DESCRIPTION OF RELATED ART

Computer viruses are a major problem in modem day computing. Generally, a computer virus is a computer program or some unit of computer executable code, e.g., instructions to which a computer responds, such as a code block, code element or code segment. When the viral code is executed on a computing device, it typically attaches to other programs or sets of computer instructions and/or replicates itself. In this way, the virus exists within and "infects" otherwise normal programs. Another typical objective of a computer virus is to perform unsolicited actions on the target computer, without the knowledge and authorization of the computer user, and thereby perform unwanted, and also possibly harmful, actions on components of the computer and/or information stored on the computer.

Some viral code may cause damage to an infected computer and/or information stored on the computer, or prevents the computer from being used in its normal manner. For example, some viruses alter or destroy data or program files stored on, for example, the hard drive of the infected computer, which typically results in considerable downtime for the computer. Additionally, in some instances the integrity of an organization's computer database(s) is attacked, and the organization, without notice of the data corruption, continues operation using inaccurate data. Even if corrupted data is detected, the organization often has to, upon discovery of the problem, take time to recover its database before it may continue its normal operation.

Frequently, the viral code resides in a file containing computer executable code comprising a collection of computer instructions. Each time the infected code runs on a computing device/system, the virus code has the opportunity to spread and do its damage on the device/system. For example, the virus may spread by adding itself to computer executable code in some other program on a computer, then changing the preexisting code in such a way that the newly added viral code may be executed to further replicate itself in yet another program. Infected programs can exist anywhere in the computer system or even the operating system itself, and if not detected can cause potentially devastating problems.

The virus also may spread from one computer file to another, and from one machine to another by attaching itself to a file or program in a removable storage medium, such as floppy disk, compact disc (CD), digital versatile disc (DVD), etc., that is accessible when the computer runs or accesses the infected file or program. If a user then places that infected medium into a second computer and the second computer runs or accesses the infected file or program, the virus will attempt to infect the second computer, and so forth. In addition, the virus may spread from one computing machine to another by attaching to data transmissions between the computer machines via a network or other transmission medium.

Computer viruses may infect a computer system by accessing protected operating system resources, such as interrupt handlers, exception handlers and other resources that require a high privilege level for access. These resources usually are protected by the computer system through, for example, restricting access to protected memory regions based on assigned privilege levels. Viruses that require access to protected resources may attempt to gain unauthorized access to the protected memory regions in order to infect portions of the computer system which allow the virus to do the most damage to the system. To do so, the virus may utilize tricks/techniques to fool the computer system into believing that the viral code really is authorized for a higher privilege level. These techniques typically consist of unusual (i.e. would not be included in non-viral code) sequences of instructions.

SUMMARY

The disclosure provides a method of detecting a computer virus that attempts to gain access to restricted computer system resources. The method includes, in accordance with one embodiment, emulating computer executable code in a subject file, and monitoring the emulation of the computer executable code and monitoring modification of memory state by the emulated code execution, to detect an attempt by the emulated code to access one or more of the restricted computer system resources.

The monitoring may include detecting installation of a new exception handler followed by forcing of a corresponding exception. The monitoring also (or alternatively) may include detecting installation of a new interrupt handler followed by forcing of a corresponding interrupt. The monitoring may include detecting installation of a new exception handler followed by forcing of a corresponding exception. The monitoring may include detecting writing of a new pointer to at least one predetermined address in system memory for storing an exception handler pointer. The monitoring may include detecting installation of a new interrupt handler followed by forcing of a corresponding interrupt. The monitoring may include detecting writing of a new pointer to at least one predetermined address in system memory for storing an interrupt handler pointer. The monitoring may include detecting use of a predetermined instruction to retrieve an address in system memory corresponding to an interrupt descriptor table.

The present disclosure also provides an apparatus for detecting a computer virus that attempts to gain access to restricted computer system resources. The system comprises, according to one embodiment, an emulator component, a monitor component and a detector component. The emulator emulates computer executable code in a subject file. The monitor component monitors the emulated code execution, monitors modification of memory state by the emulated code execution, and supplies information regarding the emulated code execution and modification of memory state by the emulated code execution. The detector component, based on the information supplied by the monitor component regarding the emulated code execution and modification of memory state by the emulated code execution, detects an attempt by the emulated code to access one or more of the restricted computer system resources.

The monitor component also may monitor system memory. The monitor component may detect use of a predetermined instruction to retrieve an address in system memory corresponding to an interrupt descriptor table.

The detector component, according to one embodiment, detects installation of a new exception handler. After the detector component detects installation of a new exception handler, the detector component monitors code execution to detect forcing of a corresponding exception. The detector component may detect writing of a new pointer to at least one predetermined address in system memory for storing an exception handler pointer. The detector component also may detect installation of a new interrupt handler. After the detector component detects installation of a new interrupt handler, the detector component monitors code execution to detect forcing of a corresponding interrupt. The detector component may detect writing of a new pointer to at least one predetermined address in system memory for storing an interrupt handler pointer.

BRIEF DESCRIPTION OF THE DRAWINGS

The features of the subject disclosure would be more readily understood from the following detailed description by referring to the accompanying drawing wherein.

DETAILED DESCRIPTION

The presence of unknown viruses, as well as known viruses, that attempt to gain access to restricted system resources in a computing device/system may be detected by recognizing the presence of unusual sequences of instructions which correspond to unauthorized access under a mask of privilege. The present disclosure provides tools (in the form of apparatus, systems and methods) for detecting computer viruses that use techniques for gaining unauthorized privileged access to restricted computer system resources. It should be noted that the apparatus, systems and methods according to the present disclosure analyzes (e.g., monitors) files containing executable computer code, so that each file being analyzed is also referred to herein as a "subject file".

Figure 4:
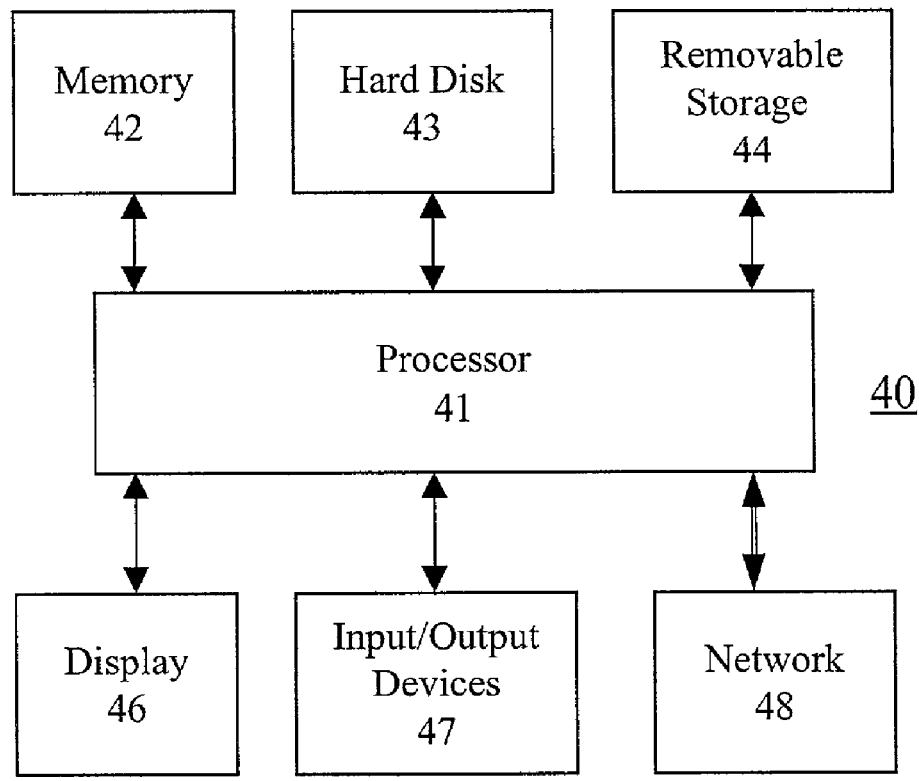
FIG. 4 shows a block diagram of a typical computing system/device that may be a target of a computer virus.

FIG. 4 illustrates a computer system or computer 40 on which computer executable code in a subject file as well as other files, such as a computer program file, may execute and/or reside. Computer system 40 comprises a processor 41, memory 42, hard disk 43, removable storage drive 44 (for reading/accessing removable storage media, such as floppy disks, CDs, DVDs, etc.), display 46, I/O devices 47 (for example, keyboard, mouse, microphone, speaker, etc.), and a wired or wireless connection to a network 48. The network can be, for example, a LAN, a WAN, an intranet, an extranet, the Internet, and/or any combinations of such networks. Computer 40 may be any of the computing devices/systems known in the art, such as, for example, a personal computer, a laptop, a workstation computer, a mainframe computer, a personal digital assistant (PDA), etc. (also referred to herein either separately or collectively as "computing device", "computer", "computer system" or "computing system"). Subject files may reside on/in, for example, hard disk 43 and/or a removable storage medium that may be read/accessed through removable storage drive 44. Also, the subject computer executable code may be downloaded to the computer system or computer through network 48.

The process of recognizing attempts by viruses to gain unauthorized access to restricted system resources in the computing device/system includes emulating computer executable code in a subject file which may be infected by such viruses and monitoring both the emulation of the computer executable code and the computer system memory state for modifications to the memory state caused by emulated instructions in the computer executable code. A number of other indicators that indicate attempts to gain privileged CPU access may be monitored as well.

It is noted that there are a number of common viral techniques that may be used to fool a computing device/system into believing that a viral code is authorized for high level access. Two of the most common techniques used by viral code to gain unauthorized access privileges are: (a) pretend to be an interrupt handler; and (b) pretend to be an exception handler.

To gain privileged access to restricted system resources, viral code may impersonate an exception handler. Exceptions are special conditions (for example, errors) that occur during computer processing, such as a divide-by-zero arithmetic operation, a memory access to an undefined or illegal memory address (e.g., not within the bounds of accessible memory), execution of an undefined computer instruction (e.g., a computer operation code that is not assigned to any defined instruction), which require special handling so that the computer can resume its processing. An exception handler is a specified computer code routine in the operating system which handles a corresponding exception (e.g., divide-by-zero), when the exception is triggered.

On most computer platforms, a portion of system memory is allocated for storing pointers to corresponding exception handler routines. On a Win32 platform (which includes Windows95, Windows98, Windows2000, Windows NT, Windows CE and Windows ME), for example, structured exception handlers (SEH) are used and, for each exception, a chain of pointers (e.g., a linked list) to handlers for the exception are stored in system memory. Thus, a virus which desires to infiltrate a computer platform which uses SEH may insert a pointer to its own viral code into the portion of system memory containing the chain of pointers to handlers for a selected exception, by writing this pointer to a system memory address (for example, fs:[0]) which has been pre-assigned for storing a pointer to a handler at the beginning of the chain corresponding to the selected exception. The virus then forces the selected exception to occur. As a result, the infected computing device/system proceeds as if an error has occurred and control of the system is passed to the viral exception handler. Since the viral code appears to have "error handler" status, it is treated as if it has higher access privileges than it otherwise would have. From this launch point, the virus is able to execute the remainder of its code at the higher access level.

A similar viral technique may be applied to interrupt handlers. Interrupts are used by other devices in a system to gain attention of the processor. For example, when an input/output device (for example, printer, modem, etc.) is ready to send/receive data to/from the processor, the device notifies the processor via an interrupt. An interrupt handler is a specified computer code routine in the operating system which handles a corresponding interrupt, when the interrupt is issued by a device in the system.

For example, a virus which is targeted at Intel x86 platforms (i.e. 80386 and above) may use the Intel x86 assembler instruction SIDTR (Store Interrupt Descriptor Table Register), which is rarely used in normal code, to retrieve an address of the Interrupt Descriptor Table (IDT) in system memory on an x86 platform. The virus then modifies an entry in the IDT corresponding to a predetermined interrupt and forces the interrupt. When the interrupt is processed, the viral pseudo-interrupt handler is called instead of the legitimate system interrupt handler. As with the SEH technique, the viral interrupt handler executes with higher access privileges than the code would otherwise have, and uses its perceived status as an interrupt handler as a launching pad from which to execute the rest of the viral code at the higher privilege level.

Figure 3:
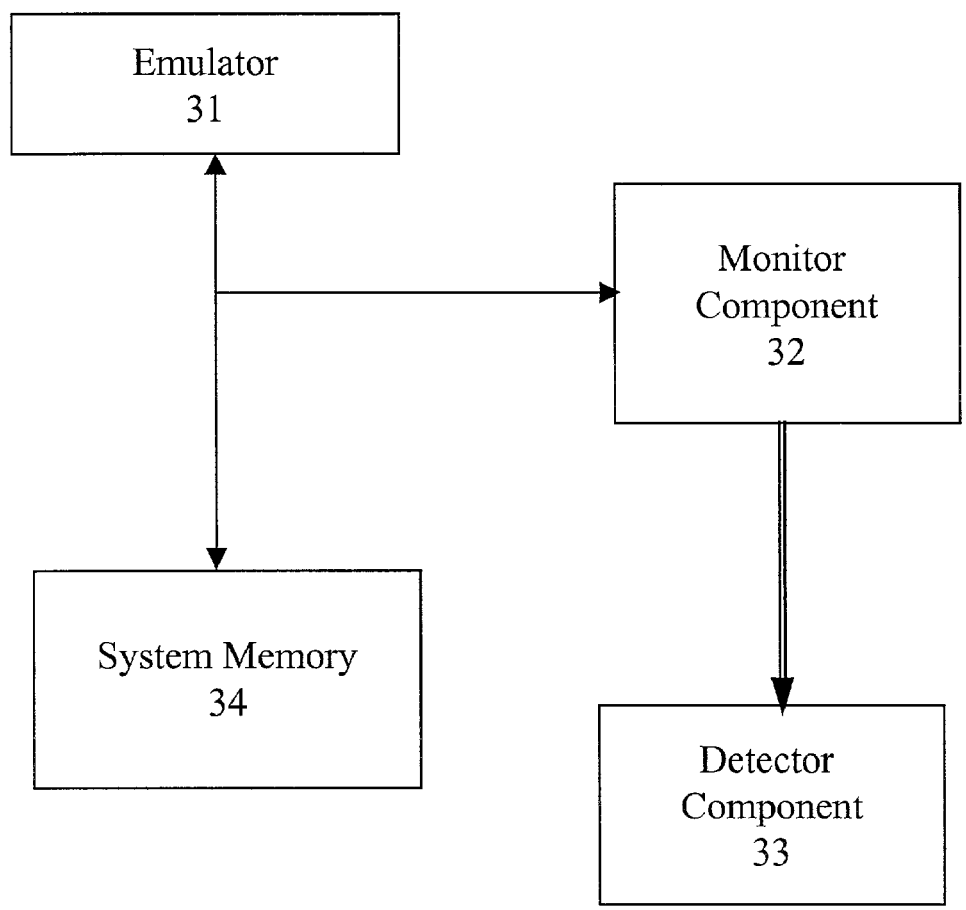
FIG. 3 shows a block diagram of a system for detecting computer viruses that attempt to gain access to restricted computer system resources, in accordance with one embodiment of the present disclosure.

An apparatus 30, in accordance with an embodiment of the present disclosure, for detecting computer viruses that attempt to gain access to restricted computer system resources is shown in FIG. 3. Apparatus 30 comprises an emulator 31, monitor component 32 and detector component 33.

Figure 1:
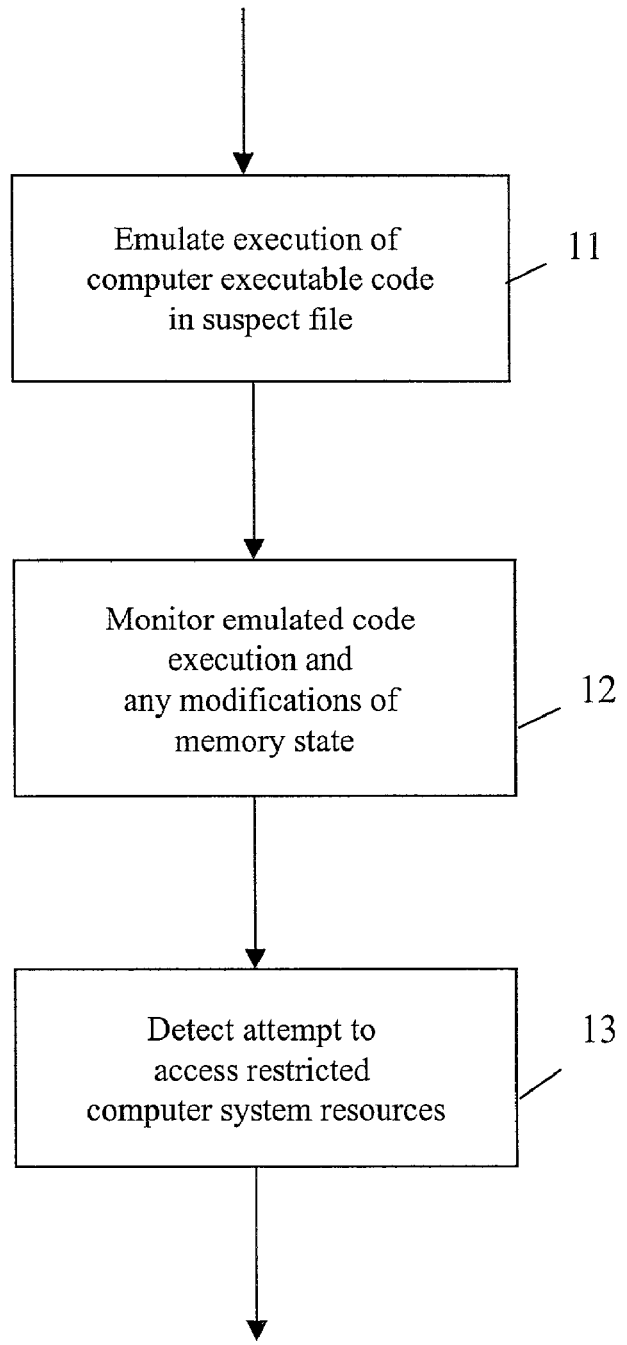
FIG. 1 shows a flow chart of a process according to an embodiment of the present disclosure for detecting computer viruses that attempt to gain access to restricted computer system resources.

A method of detecting a computer virus that attempts to gain access to restricted computer system resources will be described with reference to FIGS. 1 and 3. Execution of computer executable code in a subject file is emulated by emulator 31 (step 11). While the program file is being emulated, monitor component 32 monitors the code execution and any modifications of memory state (step 12), and supplies to detector component 33 information regarding the emulated code execution and any modifications of memory state by the emulated code execution. Based on the information supplied by monitor component 32, detector component 33 detects an attempt by the emulated code to access one or more of the restricted computer system resources (step 13). Examples of operations monitored include the installation of a new exception handler followed by forcing of a corresponding exception and/or the installation of a new interrupt handler followed by forcing of a corresponding interrupt.

Figure 2:
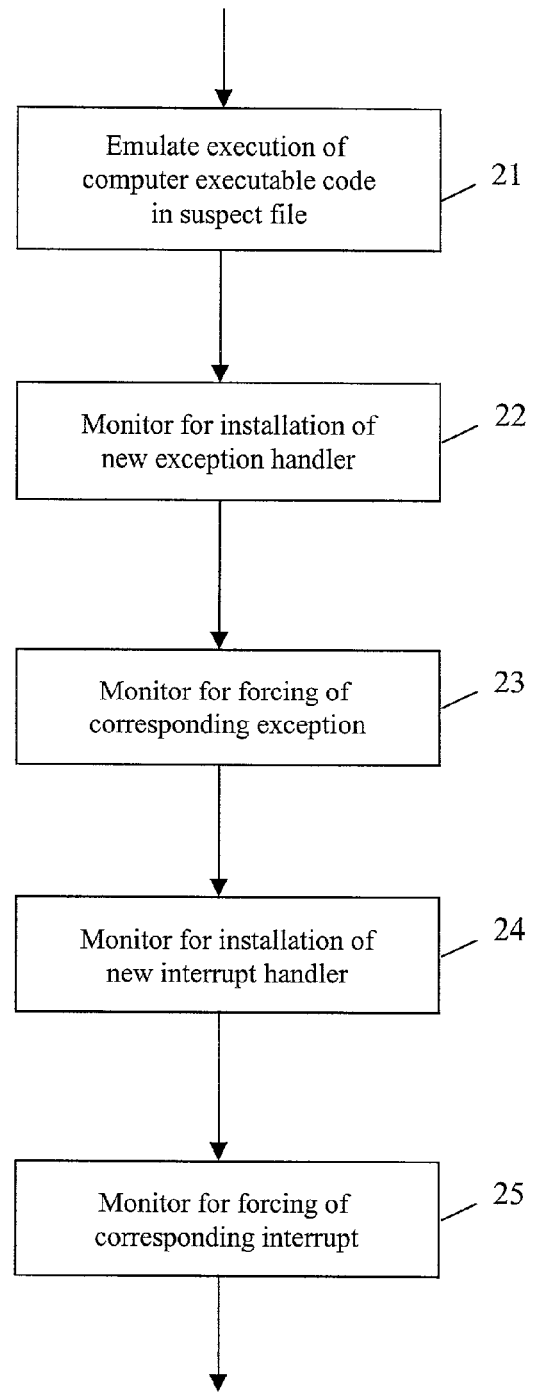
FIG. 2 shows a flow chart of a method according to another embodiment of the present disclosure for detecting computer viruses that attempt to gain access to restricted computer system resources.

A method for detecting a computer virus that attempts to gain access to restricted resources in a computer system, according to another embodiment, will be described with reference to FIGS. 2 and 3. In this embodiment, the method provides for monitoring of key indicators to detect the two viral techniques described above. In order to monitor for the indicators, execution of computer executable code in a file suspected of having viral code inside thereof is emulated by emulator 31 (step 21). The emulator emulates the computer system and emulates execution of the computer executable code in the computer system. The emulation is accompanied by monitoring, by monitor component 32, of the emulated code execution and modification of memory state by the emulated code execution. Based on information supplied by monitor component 32, the detector component 33 determines whether one or more of the indicators are triggered.

Detector component 33 detects installation of a new structured exception handler (e.g., writing to address fs:[0]) [step 22] followed by forcing of the corresponding exception (step 23). Detector component 33 also detects use of the SIDTR instruction and/or modification of the IDT (step 24) followed by forcing of the corresponding interrupt (step 25).

The apparatus and methods described above may be embodied in a computer program (or some unit of code) stored on/in computer readable medium, such as memory, hard drive or removable storage media. The apparatus and methods also may be in the form of a computer data signal, in one or more segments, embodied in a transmission medium, such as the Internet, an intranet, or another (wired or wireless) transmission medium. The present disclosure also encompasses, of course, execution of the computer program stored on/in a program storage device in a computing device/system, such as, for example, shown in FIG. 4.

The computer virus detection methodologies described above may be performed by a computer in one or a combination of the following circumstances. The computer virus detection methodologies may be performed periodically (e.g., once/twice per day) or at selected times (e.g., each time the computer is powered up or restarted) by the computer on all relevant electronic files. In addition, the computer virus detection methodologies may be performed on a file (or a data stream received by the computer through a network) before the file is stored/copied/executed/opened on the computer.

The above specific embodiments are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

The methods and apparatus according to the present disclosure may be adapted for any of numerous computer platforms/systems. For example, the preceding description of the methods were explained with a Wintel (i.e. Intel x86 and Win32) platform running in protected mode, as an example. One of ordinary skill in the art will recognize, however, that the subject matter of the present disclosure may be applied to other computing platforms, such as Macintosh-based, Unix-based (including Linux-based) platforms, and other computing platforms, such as Palm Pilots or other portable computing devices.

Also, the above-described methods and system may be integrated with selected artificial intelligence techniques. For example, the monitor and detection functionalities may be implemented in a rule-based module which is adapted to learn from detection of the upto-then-unknown viruses.

Additional variations may be apparent to one of ordinary skill in the art from reading the following U.S. provisional applications, which are incorporated herein by reference:

(a) Ser. No. 60/218,488, filed Jul. 14, 2000 and entitled "DETECTION OF A CLASS OF MALICIOUS CODE";

(b) Ser. No. 60/218,333, filed Jul. 14, 2000 and entitled "DETECTION OF SUSPICIOUS PRIVILEGED ACCESS TO RESTRICTED COMPUTER RESOURCES";

(c) Ser. No. 60/218,926, filed Jul. 14, 2000 and entitled "DETECTION OF DECRYPTION TO IDENTIFY ENCRYPTED VIRUS";

(d) Ser. No. 60/218,922, filed Jul. 14, 2000 and entitled "DETECTION OF POLYMORPHIC VIRUS CODE USING DATAFLOW ANALYSIS";

(e) Ser. No. 60/218,467, filed Jul. 14, 2000 and entitled "DETECTION OF MALICIOUS CODE USING EMULATION OF OPERATING SYSTEM FUNCTIONS"; and (f) Ser. No. 60/218,313, filed Jul. 14, 2000 and entitled "DETECTION OF POLYMORPHIC SCRIPT LANGUAGE VIRUSES BY DATA DRIVEN LEXICAL ANALYSIS".

What is claimed is:

1. A method of detecting a computer virus, comprising:
emulating computer executable code in a subject file;
detecting at least one modification to a memory state of a computer system, wherein the at least one modification:
is caused by the emulation of the computer executable code; and
comprises insertion of a pointer to a viral exception handler, the pointer associated with a particular exception;
and
detecting at least one instruction, wherein the at least one instruction forces the particular exception.

2. The method of claim 1, wherein:
the at least one modification further comprises installation of the viral exception handler.

3. The method of claim 1, wherein the particular exception comprises at least one of the following:
a divide-by-zero arithmetic operation;
an execution of an undefined computer instruction; and
a memory access to an undefined or illegal memory address.

4. The method of claim 1, wherein the computer system comprises a first memory component and a second memory component, and wherein access to the second memory component is more restricted than access to the first memory component.

5. The method of claim 4, wherein the viral exception handler attempts to modify the second memory component.

6. A method of detecting a computer virus, comprising:
emulating computer executable code in a subject file;
detecting at least one modification to a memory state of a computer system, wherein:
the memory state comprises a particular interrupt associated with a legitimate interrupt handler; and
the at least one modification:
is caused by the emulation of the computer executable code;
comprises installation of a viral interrupt handler; and
associates the particular interrupt with the viral interrupt handler instead of the legitimate interrupt handler; and
detecting at least one instruction, wherein the at least one instruction forces the particular interrupt.

7. The method of claim 6, further comprising:
detecting writing of a pointer to at least one predetermined address in a system memory for storing an interrupt handler pointer.

8. The method of claim 6, further comprising:
detecting use of a predetermined instruction to retrieve an address in a system memory corresponding to an interrupt descriptor table.

9. The method of claim 6, wherein the computer system comprises a first memory component and a second memory component, and wherein access to the second memory component is more restricted than access to the first memory component.

10. The method of claim 9, wherein the viral interrupt handler attempts to modify the second memory component.

11. A computer program for detecting a computer virus, the program embodied on a computer-readable medium, that when executed causes a computer to:
emulate computer executable code in a subject file;
detect at least one modification to a memory state of a computer system, wherein the at least one modification:
is caused by the emulation of the computer executable code; and
comprises insertion of a pointer to a viral exception handler, the pointer associated with a particular exception; and
detect at least one instruction, wherein the at least one instruction forces the particular exception.

12. A computer program for detecting a computer virus, the program embodied on a computer-readable medium, that when executed causes a computer to:
emulate computer executable code in a subject file;
detect at least one modification to a memory state of a computer system, wherein:
the memory state comprises a particular interrupt associated with a legitimate interrupt handler; and
the at least one modification:
is caused by the emulation of the computer executable code;
comprises installation of a viral interrupt handler; and
associates the particular interrupt with the viral interrupt handler instead of the legitimate interrupt handler; and
detect at least one instruction, wherein the at least one instruction forces the particular interrupt.

13. An apparatus for detecting computer viruses, comprising:
an emulator component operable to emulate computer executable code in a subject file; and
a detector component operable to:
detect at least one modification to a memory state of a computer system, wherein the at least one modification:
is caused by emulation of the computer executable code; and
comprises installation of a viral exception handler; and
detect at least one instruction, wherein the at least one instruction forces a particular exception associated with the viral exception handler.

14. The apparatus of claim 13, wherein the particular exception comprises at least one of the following:
a divide-by-zero arithmetic operation;
a memory access to an undefined or illegal memory address; and
execution of an undefined computer instruction.

15. The apparatus of claim 13, wherein the at least one modification further comprises writing of a pointer to the viral exception handler, the pointer associated with the particular exception.

16. An apparatus for detecting computer viruses, comprising:
an emulator component operable to emulate computer executable code in a subject file; and
a detector component operable to:

detect at least one modification to a memory state of a computer system, wherein the at least one modification:
   is caused by emulation of the computer executable code; and
   comprises installation of a viral interrupt handler; and
detect at least one instruction, wherein the at least one instruction forces a particular interrupt associated with the viral interrupt handler.

17. The apparatus of claim 16, wherein the at least one modification further comprises writing of a pointer to the viral interrupt handler, the pointer associated with the particular interrupt.

18. The apparatus of claim 16, wherein the at least one modification further comprises use of a predetermined instruction to retrieve an address in a system memory corresponding to an interrupt descriptor table.

\* \* \* \* \*